US 9,477,287 B1

(12) United States Patent
Schow et al.

(10) Patent No.: US 9,477,287 B1
(45) Date of Patent: Oct. 25, 2016

(54) OPTIMIZING COMPUTING RESOURCES

(75) Inventors: Kenneth M. Schow, Seattle, WA (US); Peter G. Ross, Olympia, WA (US)

(73) Assignee: Amazon Technologies, Inc., Reno, NV (US)

( * ) Notice: Subject to any disclaimer, the term of this patent is extended or adjusted under 35 U.S.C. 154(b) by 418 days.

(21) Appl. No.: 13/536,761

(22) Filed: Jun. 28, 2012

(51) Int. Cl.
*G06F 1/32* (2006.01)

(52) U.S. Cl.
CPC .............. *G06F 1/3206* (2013.01); *G06F 1/32* (2013.01)

(58) Field of Classification Search
CPC ...... G06F 1/32; G06F 1/3206; G06F 1/3234; G06F 1/3243; G06F 1/3287
USPC ................................................. 713/100, 1, 2
See application file for complete search history.

(56) References Cited

U.S. PATENT DOCUMENTS

| | | | |
|---|---|---|---|
| 6,385,739 B1* | 5/2002 | Barton et al. ............... 714/25 |
| 6,694,759 B1* | 2/2004 | Bash et al. ................ 62/180 |
| 7,262,616 B2* | 8/2007 | Brueckner et al. ...... 324/754.08 |
| 7,333,606 B1* | 2/2008 | Swam et al. ............. 379/413.04 |
| 7,388,390 B2* | 6/2008 | Brueckner et al. ........... 702/118 |
| 7,443,805 B1* | 10/2008 | Bynum ........................ 370/254 |
| 7,535,717 B2 | 5/2009 | Lai et al. |
| 7,641,101 B2 | 1/2010 | Campbell et al. |
| 7,702,479 B2* | 4/2010 | Cheemalapati et al. ...... 702/108 |
| 2003/0097233 A1* | 5/2003 | Sutton et al. ................. 702/123 |
| 2003/0200050 A1* | 10/2003 | Sharma ........................ 702/132 |
| 2003/0208284 A1* | 11/2003 | Stewart et al. ................ 700/30 |
| 2004/0078676 A1* | 4/2004 | Chi et al. ....................... 714/33 |
| 2004/0111231 A1* | 6/2004 | Ando ................... G01R 31/319 702/117 |
| 2005/0096884 A1* | 5/2005 | Fishkin et al. .................... 703/1 |
| 2005/0101257 A1* | 5/2005 | Prat et al. ................. 455/67.11 |
| 2005/0107976 A1 | 5/2005 | Klijn et al. |
| 2005/0235137 A1* | 10/2005 | Barr et al. ........................ 713/1 |
| 2006/0259203 A1* | 11/2006 | Cheemalapati et al. ...... 700/298 |
| 2008/0313476 A1* | 12/2008 | Hansen ......................... 713/300 |
| 2009/0055665 A1* | 2/2009 | Maglione et al. ............ 713/320 |
| 2009/0112780 A1* | 4/2009 | Chen et al. ..................... 706/19 |
| 2009/0204848 A1* | 8/2009 | Kube et al. ..................... 714/25 |
| 2009/0259345 A1* | 10/2009 | Kato et al. .................... 700/295 |
| 2009/0293022 A1* | 11/2009 | Fries ................................ 716/2 |
| 2010/0131109 A1* | 5/2010 | Rasmussen et al. .......... 700/277 |
| 2011/0022870 A1* | 1/2011 | McGrane et al. ............ 713/340 |
| 2011/0173474 A1* | 7/2011 | Salsbery et al. ............. 713/323 |
| 2011/0245981 A1* | 10/2011 | Refai-Ahmed et al. ...... 700/282 |
| 2011/0284629 A1* | 11/2011 | Top et al. ...................... 235/379 |
| 2012/0310618 A1* | 12/2012 | B'Far et al. .................... 703/13 |
| 2013/0025381 A1* | 1/2013 | Luo et al. .................... 73/865.6 |
| 2013/0031399 A1* | 1/2013 | Watson ......................... 713/340 |
| 2013/0158934 A1* | 6/2013 | Lee et al. ................ H04L 43/50 702/122 |
| 2013/0290758 A1* | 10/2013 | Quick et al. .......... G06F 1/3203 713/323 |

* cited by examiner

*Primary Examiner* — Vincent Tran
(74) *Attorney, Agent, or Firm* — Robert C. Kowert; Meyertons, Hood, Kivlin, Kowert & Goetzel, P.C.

(57) ABSTRACT

A method of optimizing a configuration of computing resources includes coupling computing devices to a test system. With the test system, a test is performed on one or more of the computing devices. The test includes operating the computing devices in two or more configurations. In each configuration, power consumption characteristics or thermal characteristics of the computing devices associated with the configurations are measured. Based on the measurements of power consumption characteristics, thermal characteristics, or both, a desired configuration for at least one computing device to be operated is determined.

39 Claims, 5 Drawing Sheets

OPTIMIZING COMPUTING RESOURCES

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Circuit board assemblies, power supplies, and hard disk drives all generate heat during operation. Some or all of this heat must be removed from the hard disk drives to maintain continuous operation of a server. The amount of heat generated by the circuit board assemblies, power supplies, and hard disk drives within a data room may be substantial, especially if all of the computing devices are fully powered up at all times.

In the design of a typical data center, efforts are typically made to implement a suitable amount of computing devices for a given amount of space, cooling, and electrical power resources. Various aspects of a data center may be suboptimal, however. The configurations of computing devices in a rack system or data center, for example, may not take full advantage of infrastructure resources (for example, cooling, power, or space) that could be made available to the computing devices. For example, in some rack systems, the density of computing devices achieved in a rack is too low to utilize all of the resources available to the rack, such as data ports, electrical power, or cooling capacity. On the other hand, the configuration of computing devices in a rack or a data center may overload a rack power distribution (for example, trip a breaker in a rack power distribution unit). The effect of various different component choices, firmware and hardware settings, and operating conditions on power draw and heat loads may not be known. In addition, the effect of power draw of computing devices on different environmental/cooling system conditions (for example, temperature and humidity), and vice versa, may not be known. For these reasons among others, data centers may not be optimized from the standpoint of cost or efficiency.

Figure 1:
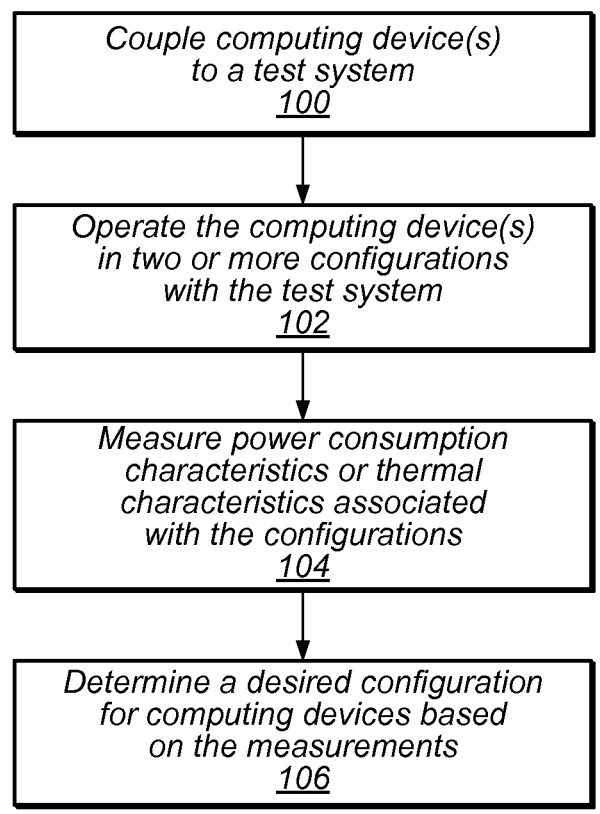
FIG. 1 illustrates one embodiment of optimizing computing resources that includes performing a test of computing devices in two or more different configurations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and systems for optimizing computing resources are described. According to one embodiment, a method of optimizing a configuration of computing resources includes coupling a computing device to a test system. With the test system, a test is performed on the computing device. The test includes operating the computing device in two or more configurations. In each configuration, power consumption characteristics or thermal characteristics of the computing device associated with the configuration are measured. Based on the measurements of power consumption characteristics, thermal characteristics, or both, a desired configuration for a computing device to be operated is determined.

According to one embodiment, a method of optimizing a configuration of computing resources includes coupling one or more computing devices to a test fixture. A test is performed on one or more of the computing devices. The test includes operating the computing devices in two or more configurations. In each configuration, power consumption characteristics or thermal characteristics of the computing devices associated with the configuration are measured. An optimization calculation is performed based on the measurements. Based on the optimization computation, thermal characteristics, or both, a desired configuration for a set of computing devices to be operated in a data center is determined.

According to one embodiment, a system includes a test fixture, a test control unit, and a cable that couples the computing devices in the test fixture to the test control unit. The test fixture includes an enclosure and one or more mounts that hold computing devices in the enclosure. The test control unit includes a processor and memory coupled to the processor. The test control unit can perform tests of computing devices on the test fixture. The tests may include operating each computing device in two or more configurations, and measuring power consumption characteristics or thermal characteristics of the computing device that are associated with each of the configurations.

As used herein, "optimization" means a process that indicates an improvement or a best value for some aspect of a system. Examples of improvements from an optimization process include lower operating temperature, lower power draw, faster processing speed, lower infrastructure requirements, fewer computing resources for a given task, higher efficiency, or higher reliability. An optimization does not necessarily require determination of a best value, configuration, or arrangement, or of a minimum or maximum of a mathematical function. An optimization may in some cases include determine of a best value, configuration, or arrangement, a minimum or maximum of a mathematical function, or both.

As used herein, "computer room" means a room of a building in which computer systems, such as rack-mounted servers, are operated.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, a "cable" includes any cable, conduit, or line that carries one or more conductors and that is flexible over at least a portion of its length. A cable may include a connector portion, such as a plug, at one or more of its ends.

As used herein, "computing" includes any operations that can be performed by a computer, such as computation, data storage, data retrieval, or communications.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "infrastructure" means systems, components, or elements of a system that provide resources for a computing device, such as electrical power, data exchange capability with external systems, air, heat removal, and environmental control (for example, humidity control, particulate control).

As used herein, "infrastructure specification" means a specification of a characteristic or condition of infrastructure or its system or its components. Examples of infrastructure specifications include a power load specification, a reliability specification for electrical power (for example, mean time between failure), a redundancy level of an electrical power system (such as N+1), an operating temperature range for air, a rate of air flow, a humidity level, or a reliability specification for a cooling resource.

As used herein, an "operating environment", in the context of computing resources, means the space, facilities and infrastructure resources provided for the computing resources. An operating environment for a set of rack computing systems includes the space, power, data interchange, cooling, and environmental control resources provided for the set of computing systems.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "rack computing systems" means a computing system that includes one or more computing devices mounted in a rack.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "reliability" is a measure of the ability of a system or components to perform or maintain functions.

In some embodiments, a test system is used to iterate through components, firmware settings, or both, to create designs based on logical service power draw. Test results may be used generate models to optimize a configuration of computing devices in a data center, operating conditions in the data center, or both. In some cases, optimization is based on a total cost of ownership for a particular service to be provided from the data center.

In some embodiments, a test system is used to test power draw during service operation at thermal rise temperature to design systems for hot data centers. Rack/data center power and optimal thermal operating temperatures may be sized for a data center. In some embodiments, an actual workload (for example, a workload for a particular customer) is spun up to determine size based on maximum logical power. In certain embodiments, a test system is used to validate specifications (for example, a specification from a vendor) for power for a particular component, such as a hard disk drive.

In some embodiments, tests performed in a test fixture model real-world conditions for a computing device or a set of computing devices. For example, temperatures in the test fixture during testing of the devices may be controlled to simulate temperatures to be encountered in a data center (such as 100 plus or minus 5 degrees F.). Data on power draw for different configurations of a computing device may be acquired. In some embodiments, a relationship is modeled between temperature and power draw based on data from testing of computing devices in a test fixture.

In some embodiments, data from testing is used to model a power draw associated with a computing device on a per feature basis. Features may include particular components (such as a particular brand and model of hard disk drive, CPU, or memory) and software or firmware configurations. In addition, a model may include operating conditions for the computing device. For example, the model may be based on testing the computing device when operating at a known temperature and humidity. Data for the model may be acquired by iterating through different configurations using a test system (for example, turning features of a computing device on or off in various combinations).

In some embodiments, a computing device is tested for performing a particular service in two or more configurations. A service may include, for example, a data storage service or a compute service.

In some embodiments, data from testing of one computing device is extrapolated to a set of computing devices to be operated. For example, data from testing of one computing device may be used to determine a desired rack density of a set of computing devices in a data center. In an embodiment, rack density for a particular rack, or for all of the racks in a data center, may be optimized based on data from testing from the test.

In some embodiments, a test fixture is used to test two or more computing devices, each in a different configuration. For example, a test fixture may be used to test one computing device with hard disk drives from one vendor, a second computing device with hard disk drives from a second vendor, and so on.

In some embodiments, data from a model based on device testing is used to determine one or more infrastructure specifications for computing resources. The specification may be applied, for instance, to infrastructure for a set of computing devices, a rack computing system, a computing room. As an example, a model may be used to determine a cooling air specification for the room of a data center.

In various embodiments, data from tests on computing devices is used to perform optimization of a computing device or a set of computing devices. Optimization may include determining configurations of systems and power designs, rack/datacenter densities, and cooling costs that reduce total cost of ownership. In some embodiments, lower cost systems are designed by finding the integrated and individual power draw for system components. The system may iterate through different HDDs, memory, cards, CPUs, PSUs, and firmware settings (NUMA, Turbo, etc.) to find optimal parts/configurations that provide an optimal combination of functionality and lowest power draw.

In certain embodiments, a test fixture with an enclosure is used to measure actual delta power draw for one or more thermal events for one or more devices (for example servers). From the measurements taken, models may be created for data center cooling. Thermal events may be modeled to determine the effect of the effects on power consumption. Data may also be collected relating to thermal failure and recovery for the computing devices. Based on the models, a desired configuration of servers and operating conditions in a data center may be determined. In some instances, changes to a server design may allow operating temperatures at a datacenter to be increased (thus lowering cooling costs).

In some embodiments, the difference between maximum system draw and logical service draw is determined. In this case, a determination may be made of how much power a particular service is actually drawing (instead of, for example, a maximum draw according to written specification), and racks/data centers may be sized accordingly. From data acquired from the testing, systems with increased rack densities and increased infrastructure utilization or efficiency may be developed and implemented.

In some embodiments, a desired configuration may include assessing a trade-off between component cost and data center operating cost. The trade-off may be based on models created from test data acquired from tests simulating real-world conditions for computing devices in a data center. For example, based on data from a test, it may be determined that computing devices in a rack can be operated at a higher operating temperature if a different hard disk drive is used. The model may indicate that the costs saving from operating at the higher operating temperatures exceed the incremental acquisition costs of the different hard disk drive.

In an embodiment, optimizing computing resources includes performing a test of one or more computing devices in different configurations (for example, by iterating through different combinations of with the test system). Power consumption characteristics (such as power draw) and/or thermal characteristics associated with one or more of the computing devices may be measured. Based on the measurements, a desired configuration of one or more computing devices to be operated is determined. FIG. 1 illustrates one embodiment of optimizing computing resources that includes performing a test of computing devices in two or more different configurations. At 100, one or more computing devices are coupled to a test system. The system may include, for example, an enclosed test fixture such as described herein.

At 102, computing devices are operated in two or more configurations. In some embodiments, changes to each configuration are made automatically by the test system in a sequential manner. Changes to a different configuration may include changing various features of computing device in various combinations. Examples of changes include swapping a component, such as a hard disk drive, adding or removing components, or changing a software or firmware configuration. Operating conditions, such as ambient temperature in the test chamber at the location of the computing device, may be controlled. In certain embodiments, testing may include changes to a configuration of kernel or service operating layers in a computing device.

At 104, power consumption characteristics, thermal characteristics, or both for the computing devices associated with each of at least some of configurations are measured. Measuring power consumption characteristics may, for example, include measuring power draw for a particular set of components, for a particular service, and under a particular set of operating conditions.

At 106, determining, a desired configuration for at least one computing device to be operated is determined based on the measurements of power consumption characteristics, thermal characteristics of the computing device, or both. The desired configuration may be extrapolated to two or more computing devices to be used. For example, a desired configuration may be based on the assumption that a particular number of computing devices in that configuration will be included in the data center (for example, twenty computing devices in a particular configuration in one or more racks).

In some embodiments, determining the desired configuration includes one or more optimization calculations. The optimization calculations may be based on a model produced from the measurements. Rules may be applied by the system to automatically to determine a desired configuration. Optimization may be based on a model that includes a relationship between cost (such as total cost of ownership) and one more other factors. For example, optimization may be based on a relationship between cost and reliability, cost and efficiency, or cost and power consumption.

In certain embodiments, measurements from a test of computing devices may include optimization of rack density. For example, test data and modeling may be used to determine the configuration and number of computing devices to be included in rack. The optimization may be based on a model that includes power draw, thermal characteristics, acquisition cost, and operating cost.

In some embodiments, performing an optimization for computing resources, or determining a desired configuration of a system or its components, includes implementing one or more rules. Rules may be implemented using a rules engine or other tool. A user may provide inputs for implementing rules. The inputs may define various configurations, settings, parameters, values, or constraints for an optimization or recommendation. Examples of inputs include device configuration, software settings, operating parameters, operating conditions, limits, specifications, infrastructure, operating profiles, computing service profiles, and use cases. As an example, inputs for a rules engine may include hard disk drive type, cooling air flow rate, inlet air temperature, operating temperature limit, and maximum power draw. Rules may be applied for one or more measurements of power draw, thermal characteristics, performance, or reliability of computing devices.

In some embodiments, user-provided inputs are used to implemented rules to define a test procedure or sequence for computing devices. In some embodiments, determining a desired configuration of a system or its components, or performing an optimization, includes linear programming based on user-provided inputs, test measurements, or a combination thereof.

In some embodiments, the model includes information to relate power draw to different configurations of computing devices to be operated in a data center. In certain embodiments, a model includes a relationship between power draw and temperature.

Once a desired configuration has been determined, one or more computing devices in the desired configuration may be operated to perform services. Services may be performed, for example, by a rack computing system operating in the room of a data center. In some embodiments, a set of two or more computing devices in a desired configuration is provided for performing the services.

Figure 2:
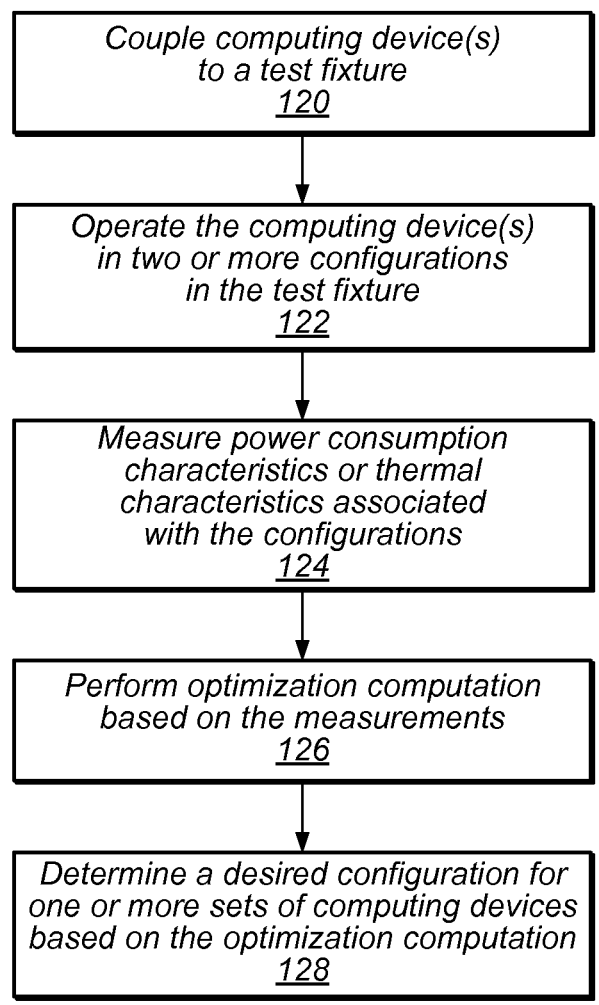
FIG. 2 illustrates one embodiment of optimization to determine a desired configuration of computing devices in a data center.

In some embodiments, a method of optimizing computing resources in a data center includes performing, in a test fixture, a test on one or more computing devices in two or more different configurations. Power consumption characteristics (such as power draw) and/or thermal characteristics associated with one or more of the computing devices are measured. An optimization calculation may be performed using the measurements. Based on the optimization calculation, a desired configuration of a set of two or more computing devices to be operated in the data center is determined. The set of computing devices may be, for example, the computing devices to be operated in a rack (for example, to establish a rack density), or the computing devices to be operated in a room of the data center. FIG. 2 illustrates one embodiment of optimizing computing resources that includes optimization to determine a desired configuration of computing devices in a data center. The set of computing devices may be, for example, the computing devices to perform a particular service, or the computing devices to be operated in a particular rack. At 120, one or more computing devices are coupled to a test fixture. The fixture may be, for example, an enclosed test fixture such as described herein.

At 122, computing devices are operated in two or more configurations. In some embodiments, changes to each configuration are made automatically by the test system in a sequential manner. Changes to a different configuration may include changing various features of computing device in various combinations. Operating conditions, such as ambient temperature in the test chamber at the location of the computing device, may be controlled.

At 124, power consumption characteristics, thermal characteristics, or both for the computing devices associated with each of at least some of configurations are measured. Measuring power consumption characteristics may, for example, include measuring power draw for a particular set of components, for a particular service, and under a particular set of operating conditions.

At 126, an optimization computation is performed based on the measurements. The optimization computation may be based on a model produced from the measurements. In some embodiments, optimization is based on relationship between power draw and one or more other factors. In one embodiment, the model includes a relationship between power draw and temperature based on the measurements acquired during test of the computing devices in the test fixture.

At 128, a desired configuration for a set of computing devices to be operated in the data center is determined based on the measurements of power consumption characteristics, thermal characteristics of the computing device, or both.

In the illustration described above with respect to FIGS. 1 and 2, the optimization and desired configuration was determined for computing devices to be deployed. The use of test data from of fixture is not, however, limited to the configuration of the computing devices themselves. In certain embodiments, optimization may be performed, or a desired configuration or characteristics may be determined, for operating conditions, specifications, or infrastructure for computing resources. For example, an optimization may be used to determine an operating temperature for a data center, or a maximum power draw for computing devices in a rack.

In one embodiment, information for optimization is acquired and compiled from output of from the test system. The information may be used to determine a score. For example, a total cost of configuration score. A configuration may be chosen based on scores for different configurations (for example, the best score from tests of two or more different configurations of a rack). Scores may be based on, or evaluated against, a financial model. In some embodiments, the score is based on how much power is drawn in different configurations. Cost and density trade-offs may be made based on the output of the test system.

Figure 3:
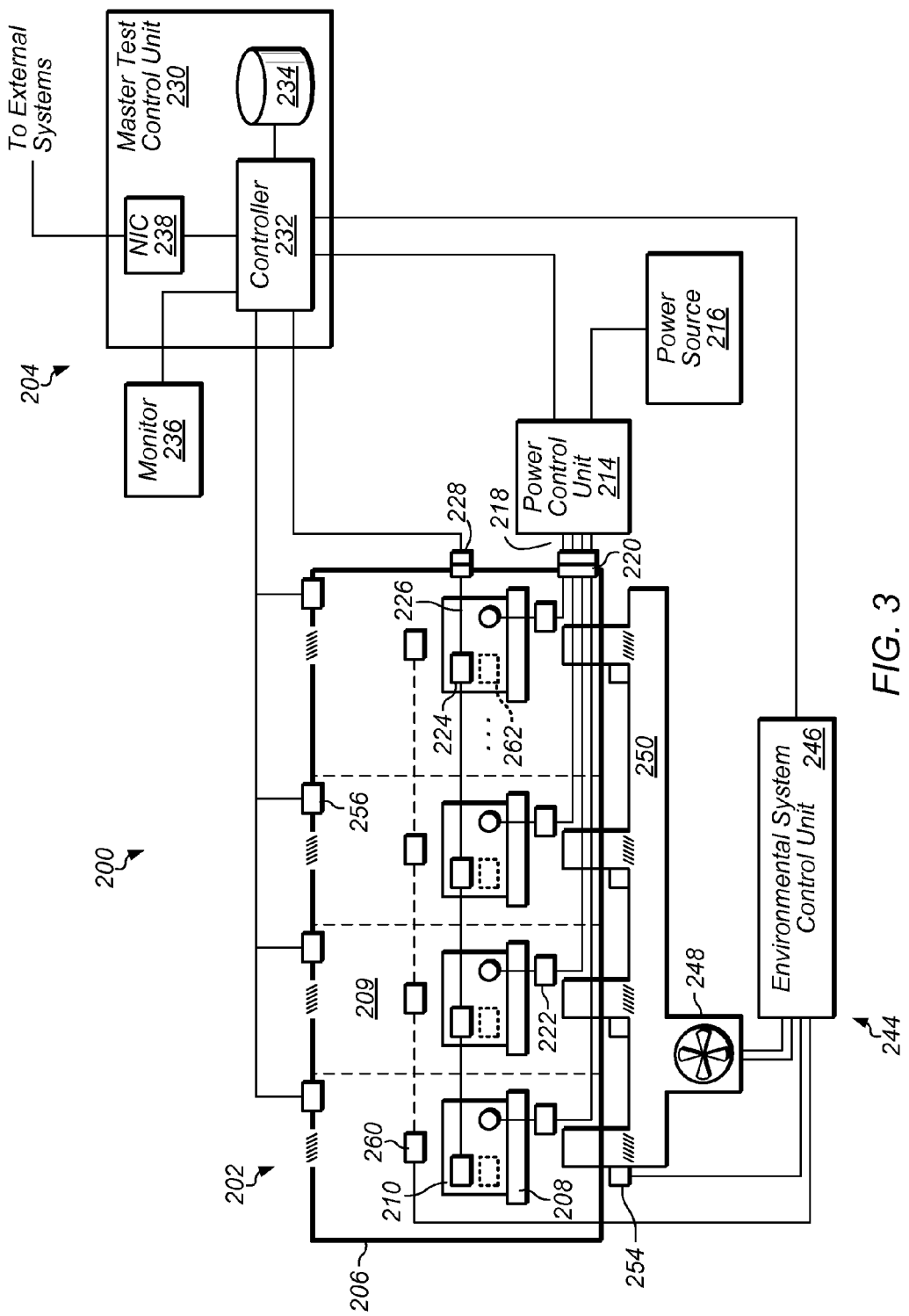
FIG. 3 illustrates one embodiment of a system for testing computing devices, such as servers, in multiple configurations.

In some embodiments, a test system for testing power consumption and thermal characteristics for a computing device (for example, server) includes a test fixture with an enclosure and a test control unit that can test the computing device in multiple configurations. FIG. 3 illustrates one embodiment of a system for testing computing devices, such as servers, in multiple configurations. Test system 200 includes test fixture 202 and master test control unit 204. Test fixture 202 includes enclosure 206 and mounting platforms 208. Each of mounting platforms 208 may hold one or more computing devices 210. Enclosure 206 forms test chamber 209. Mounting platforms 208 may support computing devices 210 such that computing devices 210 are contained with enclosure 206. Each of computing devices 210 may be tested using master test control unit 204.

Power control unit 214 may supply electrical power from power source 216 to each of computing devices 210 in enclosure 206 by way of cables 218. Cables 218 may enter test chamber 209 by way of panel connector 220 at a wall of enclosure 206. Power sensors 222 may be included between power control unit 214 and computing devices 210. Power sensors 222 may sense one or more characteristics of electrical power supplied to computing devices 210. In one embodiment, power sensors 222 are current transformers ("CT"). In another embodiment, power sensors 222 include proxy plugs.

Power sensors 222 may be coupled to test control system 202. Signals or information from power sensors 222 may be used to determine power draw to each of sensors 222.

Test control system 204 may exchange data with computing devices 210 by way of I/O cables 226. I/O cables 226 may enter test chamber 209 by way of panel connector 228 at a wall of enclosure 206.

Test control system 204 includes master test control unit 230. Master test control unit 230 includes controller 232, data storage device 234, monitor 236, and network interface card 238. Master test control unit 230 may exchange data and instructions with external systems over network connection by way of network interface card 238. Monitor 236 may be accessed by user to control tests, access test information, or both.

Test system 200 includes environmental system 244. Environmental system 244 includes environmental system control unit 246 and cooling air system 248. Cooling air system 248 is coupled to environmental control unit 246. Environmental control unit 246 may be used to control conditions in test chamber 209, such as temperature, humidity, and pressure.

Cooling air system 248 may feed air to enclosure 206 by way of plenum 250. In some embodiments, cooling air system 248 provides forced air at ambient temperature or above. In some embodiments, cooling air system 248 may include, or be coupled to, a mechanical cooling system or chilled water system.

Environmental system 244 includes supply vents 254 and exhaust vents 256. Supply vents 254, exhaust vents 256, or both, may be adjustable. Supply vents 254 and exhaust vents 256 may be adjusted to control air flow in and out of chamber 209. In some embodiments, air vents are controlled automatically, for example, by master test control unit 230.

Although in FIG. 3, environmental system 244 includes supply vents 254 and exhaust vents 256, a test fixture may, in various embodiments, could have other arrangements for controlling air in a test chamber. For example, a cooling air system may introduce air and evacuate air by way of the same set of openings. In some cases, vents are manually adjustable.

Although in FIG. 3, supply vents 254 and exhaust vents 256 are shown schematically shown as having louvers, vents may in various embodiments have any suitable arrangement. In one embodiment, vents for a test chamber are in the form of holes in the ceiling, wall, or floor of the test chamber. A sliding panel may be adjustably positioned over some or all of the holes to control airflow into, or out of, the test chamber.

Various sensors may be included in test chamber 209 for use in sensing and estimating environmental conditions experienced by computing devices 210, including ambient temperature conditions, conditions with a computing device chassis, or on a circuit board or component. Sensors 260 may include, for example, temperature sensors, humidity sensors, pressure sensors, or combinations thereof. Sensors 262 may be included on a chassis for each of computing devices 210. Each of the sensors 260 and 262 may be coupled to master test control unit 230.

Test control system 204 may control tests on one or more computing devices 210 in test chamber 209. In some embodiments, test control system 204 may be used to model. Controller 204 may be operated to iterate through combinations of device configurations of computing devices and/or operating conditions.

In some embodiments, data is acquired and compiled from testing relating to component performance and reliability. Examples of data that may be acquired in various embodiments include components failures, thermal overload conditions, I/O errors, and dropped packets.

In some embodiments, tests results data and modeling information may be presented to users. Users may access the data via monitor 236 or by way of external systems (for example, via network interface card 238). The system may allow a user to provide inputs for performing optimizations. Test data and model data may be presented graphically. For example, graphs may be displayed to user showing a relationship between temperature and power draw. Different graphs may be presented for each configuration tested. In some embodiments, optimization may be based on one or more confidence levels derived from test data and/or models.

In the embodiment shown in FIG. 3, master test control unit 204, power control unit 214, and environmental system control unit 246 are shown as separate components. In other embodiments, nevertheless, one or more of the test control, power control, environmental functions may be performed with a single system (for example, with a single controller). Any or all of master test control unit 204, power control unit 214, and environmental system control unit 246 may be connected to one another through a common network connection. In certain embodiments, one or more of a master test control unit, power control unit, and environmental system control unit may be independent of one another. In various embodiments, some or all aspects of test control, test analysis, and optimization may be performed by external systems. The external systems may be connected to test system control devices (such as master test control unit 204, power control unit 214, and environmental system control unit 246), or directly to computing devices in a test fixture (for example, by way of network connection).

In the embodiment shown in FIG. 3, the units under test are described as computing devices. A test system may, however, be used in various embodiments to test, prototype, and optimize any electrical system. Examples of other electrical systems that may be modeled in a test system include network control devices, power supply units, power distribution units, air moving devices, and mass storage devices.

In the description above, the test fixture has been described as holding computing devices in the form of a module (for example, with all of the components already installed in common chassis). A test fixture nevertheless may in some embodiments be used to test individual components. Examples of components that can be tested individually include a motherboard, central processing unit, a power supply unit, or a hard disk drive. A test fixture may also be used to test two individual components in combination. In some embodiments, a test fixture is used to test a set of individual components operating in combination as a server.

In one embodiment, a test fixture includes an anti-static baseboard for mounting a server motherboard and all applicable cards, memory, and hard disk drives to be used in the server. A box-top enclosure is included with specific cut-outs for power, console, network, thermocouples, and exhaust flap for heat dispersion. A test system may include a standard power meter with one or more thermocouples.

Figure 4:
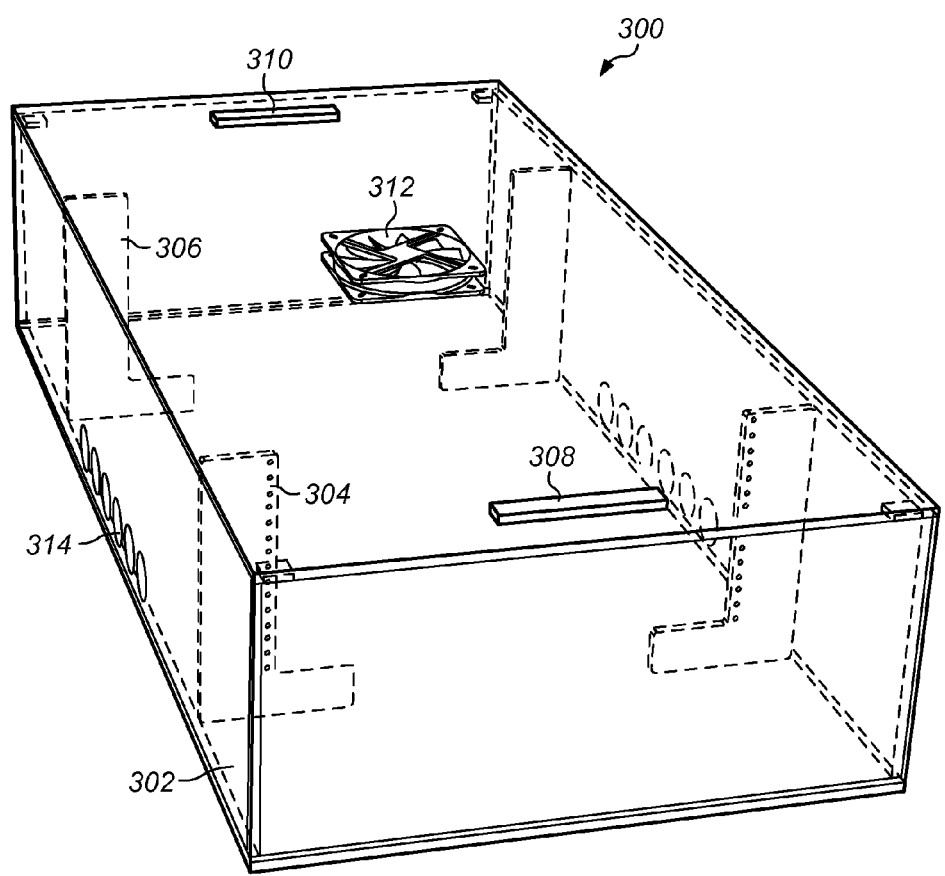
FIG. 4 illustrates one embodiment of a test fixture for testing computing devices to determine a desired configuration of computing devices.
Figure 5:
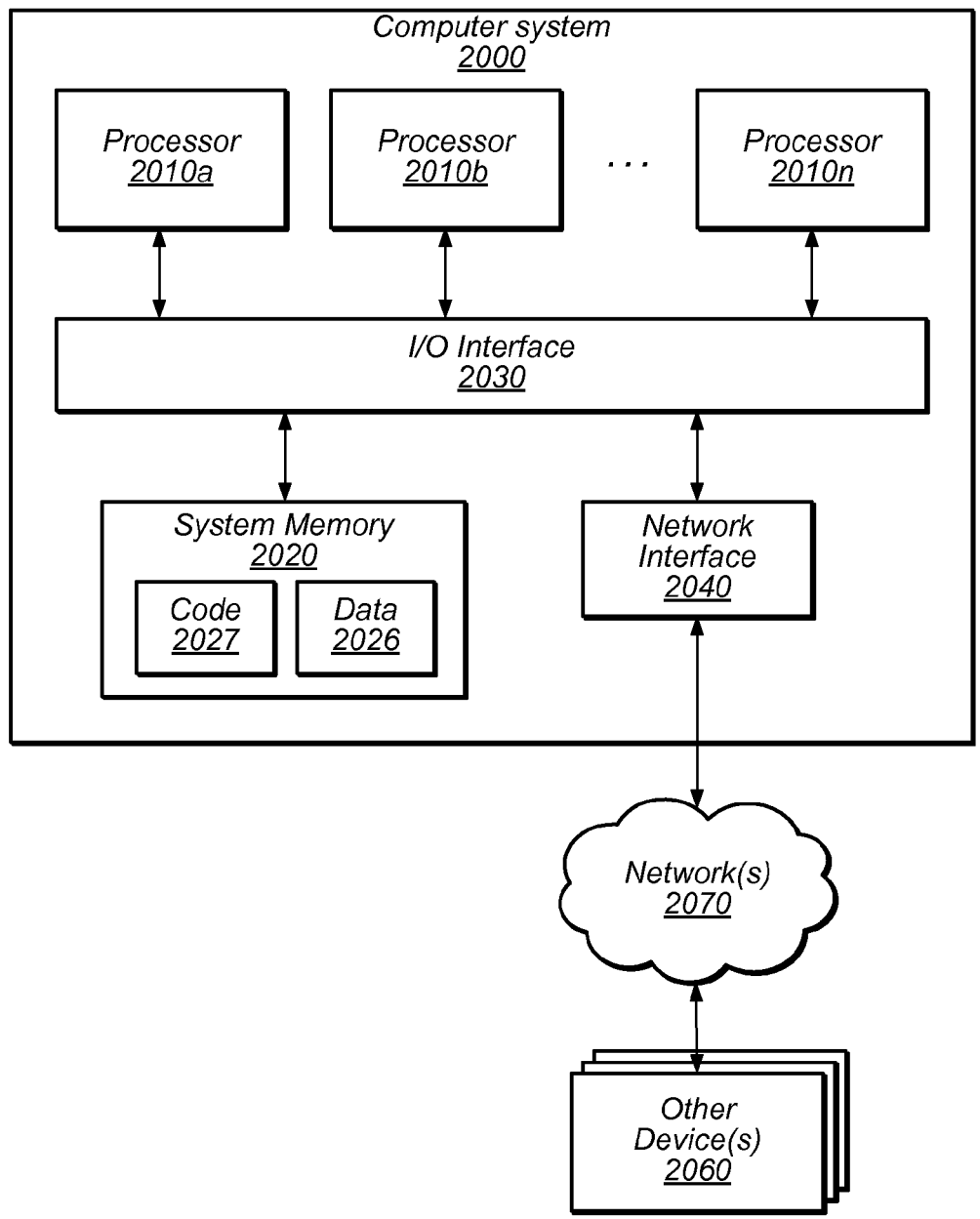
FIG. 5 illustrates one embodiment of a computer system that can be used to perform computing device testing.

FIG. 4 illustrates one embodiment of a test fixture for testing computing devices to determine a desired configuration of computing devices. The test fixture may be used to test computing devices in a chassis, individual components of a computing, or combinations thereof. Test fixture system 300 includes enclosure 302, front mounts 304, and rear mounts 306. Servers or components to be tested may be installed on front mounts 304 and rear mounts 306.

Test fixture system 300 may be connected a test control system, such as test control unit 204 described above relative to FIG. 3. Test fixture system 300 includes front electrical connector 308, rear electrical connector 310, fan 312, and side vents 314. Front electrical connector 308 and rear electrical connector 310 may be used to transfer power, signals, and data into and out of enclosure 302. Fan 312 may be operated to move air through devices under test in the chamber. In one embodiment, fan 312 is operated to draw air through the top of enclosure 302. Air may be drawn into enclosure 302 through side vents 314. In one embodiment, a dc fan is operated change the rate of a flow air in a chamber. Air flow may be controlled via a control feedback loop from an internal temperature at the inlet to the server under test via a PID control algorithm.

Although the test fixture system illustrated in FIG. 4 includes only a single test chamber for illustrative purposes, a test fixture system may some embodiments include two or more chambers. The chambers environmental conditions in the chambers may be commonly controlled or independently controlled.

Illustrative Computer System

In some embodiments, a server that implements a portion or all of one or more of the technologies, including but not limited to methods and apparatus for performing testing, computation, optimization, and reporting as described herein, may include a general-purpose computer system that includes or is configured to access one or more computer-accessible media, such as computer system 2000 illustrated in. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2070, such as other computer systems or devices as illustrated in FIGS. 1 through 3, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data for implementing embodiments of data transfer and storage methods as described above relative to FIGS. 1-3. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of optimizing a configuration of computing resources in a data center, comprising:
coupling one or more computing devices to a test fixture;
performing, in an enclosure of the test fixture, a test on at least one of the computing devices, wherein performing the test comprises:
controlling environmental conditions within the enclosure according to a particular set of environmental test conditions;
operating the at least one computing device in a first configuration under the particular set of environmental test conditions;
changing out one or more physical components of the at least one computing device such that a configuration of the at least one computing device is changed from the first configuration to one or more other configurations;
operating the at least one computing device in the one or more other configurations under the particular set of environment test conditions;
controlling environmental conditions within the enclosure according to another set of environmental test conditions;
operating the at least one computing device in the first configuration and the one or more other configurations under the other set of environmental test conditions; and
measuring power consumption characteristics or thermal characteristics of the at least one computing device associated with each of at least two of the configurations under the particular set of environmental test conditions and with each of at least two of the configurations at the other set of environmental test conditions;
performing at least one optimization calculation based, at least in part, on the measurements; and
determining, by a computer system, based at least in part on the optimization calculation, a desired configuration for a set of computing devices to be operated in the data center,
wherein the optimization calculation is based, at least in part, on measurements of the at least one computing device in the at least two configurations under the particular set of environmental test conditions and is based, at least in part, on measurements of the at least one computing device in the at least two configurations under the other set of environmental test conditions.

2. The method of claim 1, wherein determining the desired configuration for the set of computing devices to be operated in the data center comprises modeling one or more characteristics of the at least one of the tested computing devices based at least in part on the measurements.

3. The method of claim 1, wherein, for at least one of the computing devices, measuring the power consumption characteristics or thermal characteristics of the computing devices comprises measuring a power draw for at least one configuration of the computing device.

4. The method of claim 3, wherein determining the desired configuration for the set of computing devices to be operated in the data center comprises:
modeling, based at least in part on the measurements, a relationship between temperature and power draw, and
wherein the optimization is performed based in part on the relationship between power draw and temperature.

5. The method of claim 1, wherein determining the desired configuration for the set of computing devices to be operated in the data center comprises:
modeling, based at least in part on the measurements, a relationship between reliability and cost, and
wherein the optimization is performed based in part on the relationship between reliability and cost.

6. The method of claim 1, wherein the set of computing devices comprises servers to be operated in a rack.

7. The method of claim 1, wherein determining the desired configuration for the set of computing devices to be operated in the data center comprises determining a rack density for one or more racks in the data center.

8. The method of claim 1, wherein, for at least one of the computing devices, operating the computing device in the first configuration and the one or more other configurations further comprises changing a software configuration in the computing device.

9. The method of claim 1, wherein the optimization computation is based at least in part on a service that is to be provided with the set of computing devices.

10. A method of optimizing a configuration of computing resources, comprising:
coupling one or more computing devices to a test system;
performing, within an enclosure of the test system, a test on at least one of the computing devices, wherein performing the test comprises:
controlling environmental conditions within the enclosure according to a particular set of environmental test conditions;
operating the at least one computing device in a first configuration under the particular set of environmental test conditions;
changing out one or more physical components of the at least one computing device such that a configuration of the at least one computing device is changed from the first configuration to one or more other configurations;
operating the at least one computing device in the one or more other configurations under the particular set of environment test conditions;
controlling environmental conditions within the enclosure according to an other set of environmental test conditions;
operating the at least one computing device in the first configuration and the one or more other configurations under the other set of environmental test conditions; and
measuring power consumption characteristics or thermal characteristics of the at least one computing device associated with each of at least two of the configurations under the particular set of environmental test conditions and with each of at least two of the configurations under the other set of environmental test conditions;
determining, by a computer system, based, at least in part, on the measurements of power consumption characteristics or thermal characteristics of the at least one computing device a desired configuration for the at least one computing device to be operated, wherein the measurements on which said determining is based comprise measurements in the at least two configurations under the particular set of environmental conditions and measurements in the at least two configurations under the other set of environmental conditions.

11. The method of claim 10, further comprising operating the at least one computing device in the desired configuration to perform one or more services.

12. The method of claim 10, wherein determining the desired configuration of the at least one computing device comprises performing at least one optimization calculation based at least in part on the measurements.

13. The method of claim 10, wherein determining the desired configuration for the at least one computing device to be operated comprises modeling one or more characteristics of the at least one computing device based at least in part on the measurements.

14. The method of claim 10, wherein, for the at least one computing device, measuring the power consumption characteristics or thermal characteristics of the at least one computing device comprises measuring a power draw for at least one configuration of the at least one computing device.

15. The method of claim 14, wherein determining the desired configuration for the at least one computing device to be operated comprises:
modeling, based at least in part on the measurements, a relationship between temperature and power draw; and
performing an optimization based on the relationship between power draw and temperature.

16. The method of claim 15, wherein performing the optimization based on the relationship between power draw and temperature comprises modeling a trade-off between power draw and temperature.

17. The method of claim 10, wherein determining the desired configuration comprises applying, by the computer system, one or more rules.

18. The method of claim 10, wherein, for at least one of the tested computing devices, measuring the power consumption characteristics or thermal characteristics of the computing devices comprises measuring a temperature for at least one configuration of the computing device.

19. The method of claim 10, wherein, controlling the environmental conditions within the enclosure includes controlling a temperature within the enclosure.

20. The method of claim 10, wherein, for the at least one computing device, the test is performed based at least in part on a service that is to be provided with the at least one computing device.

21. The method of claim 10, wherein, for the at least one computing device, operating the at least one computing device in two or more configurations comprises changing a software configuration or a firmware configuration of the computing device.

22. The method of claim 10, wherein, for the at least one computing device, operating the at least one computing device in two or more configurations comprises changing a software configuration in the computing device.

23. The method of claim 10, wherein the at least one computing device comprises a set of computing devices to be operated in a rack.

24. The method of claim 23, wherein determining the desired configuration for the at least one computing device comprising the set of computing devices to be operated in the rack comprises determining a rack density for one or more racks in a data center.

25. The method of claim 10, wherein the at least one computing device comprises a set of computing devices to be operated in a data center.

26. A system, comprising:
a test fixture comprising an enclosure; and
a test control unit comprising:
a processor;
a memory coupled to the processor and configured to store program instructions executable by the processor to implement:
performing a test on at least one computing device, wherein performing the test comprises:
controlling environmental conditions within the enclosure according to a particular set of environmental test conditions;
operating the at least one computing device in a first configuration under the particular set of environmental test conditions;
operating the at least one computing device in one or more other configurations under the particular set of environmental conditions, wherein in the one or more other configurations one or more physical components of the at least one computing device are changed out;
controlling environmental conditions within the enclosure according to an other set of environmental test conditions;
operating the at least one computing device in the first configuration and the one or more other configurations under the other set of environmental test conditions; and
measuring power consumption characteristics or thermal characteristics of the at least one computing device associated with each of at least two of the configurations under the particular set of environmental test conditions and with each of at least two of the configurations under the other set of environmental test conditions; and
determining, based, at least in part, on the measurements of power consumption characteristics or thermal characteristics of the at least one computing device a desired configuration for operation of the at least one computing device,
wherein the measurements on which said determining is based comprise measurements in the at least two configurations under the particular set of environmental test conditions and measurements in the at least two configurations under the other set of environmental test conditions.

27. A non-transitory computer-readable storage medium, storing program instructions computer-executable on one or more computers to implement:
performing a test on at least one computing device, wherein performing the test comprises:
operating the at least one computing device in a first configuration under a particular set of environmental conditions;
operating the at least one computing device in one or more other configurations under the particular set of environmental conditions, wherein in the one or more other configurations one or more physical components of the at least one computing device are changed out;

operating the at least one computing device in the first configuration and the one or more other configurations under an other set of environmental conditions; and measuring power consumption characteristics or thermal characteristics of the at least one computing device associated with each of at least two of the configurations under the particular set of environmental conditions and with each of at least two of the configurations under the other set of environmental conditions; and determining, based, at least in part, on the measurements of power consumption characteristics or thermal characteristics of the at least one computing device, a desired configuration for operation of the at least one computing device, wherein the measurements on which said determining is based comprise measurements in the at least two configurations under the particular set of environmental conditions and measurements in the at least two configurations under the other set of environmental conditions.

28. A system, comprising:
a test fixture comprising:
  one or more enclosures; and
  one or more mounts configured to hold one or more computing devices in at least one of the enclosures,
  wherein the test fixture is configured to provide controlled environmental conditions within the test fixture;
a test control unit comprising:
  a processor;
  a memory coupled to the processor and configured to store program instructions executable by the processor to implement:
    performing, on at least one computing device of the one or more computing devices in the test fixture, a test, wherein performing the test comprises:
      operating the at least one computing device in two or more configurations under a particular set of environmental conditions, wherein at least one physical component of the at least one computing device is changed out to change configurations of the at least one computing device;
      operating the at least one computing device in the two or more configurations under an other set of environmental conditions, wherein at least one physical component of the at least one computing device is changed out to change configurations of the at least one computing device; and
      measuring power consumption characteristics or thermal characteristics of the at least one computing device associated with each of at least two of the two or more configurations under the particular set of environmental conditions and with each of at least two of the two or more configurations under the other set of environmental conditions; and
      determining, based, at least in part, on the measurements of power consumption characteristics or thermal characteristics of the at least one computing device a desired configuration for the at least one computing device to be operated,
    wherein the measurements on which said determining is based comprise measurements in the two or more configurations under the particular set of environmental conditions and measurements in the two or more configurations under the other set of environmental conditions; and
  one or more cables configured to couple the at least one computing device in the test fixture to the test control unit.

29. The system of claim 28, further comprising one or more power consumption sensors coupled to the test control unit, wherein at least one of the power consumption sensors is configured to sense power consumption of the at least one computing device.

30. The system of claim 28, further comprising a power control system configured to control power to the at least one computing device in at least one of the one more enclosures.

31. The system of claim 28, further comprising one or more temperature sensors coupled to the test control unit, wherein at least one of the temperature sensors is configured to sense a temperature in at least one location in the at least one computing device.

32. The system of claim 28, further comprising an environmental control system configured to control one or more environmental characteristics of the at least one computing device in at least one of the one or more enclosures.

33. The system of claim 32, wherein the environmental control system is configured to supply air below ambient temperature.

34. The system of claim 28, further comprising one or more adjustable vents configured to control venting of heated air from at least one of the enclosures.

35. The system of claim 34, wherein the environmental control system is configured to control a rate of air flow in at least one of the enclosures based on one or more characteristics of air in the enclosure.

36. The system of claim 34, wherein at least one of the one or more adjustable vents is coupled to a control unit, wherein the control unit is configured to control flow through the at least one adjustable vent.

37. The system of claim 28, further comprising a user display, wherein the system is configured to present graphical information for use in optimizing computing resources based on measurements taken in the test fixture.

38. The system of claim 28, wherein the test fixture is configured to hold two or more computing devices, wherein the test control unit is configured to perform tests on at least two of the two or more computing devices.

39. The system of claim 28, wherein the test fixture is configured to hold two or more computing devices, wherein at least one of the computing devices is in a separate chamber from at least one other computing device.

* * * * *